Figure 1:
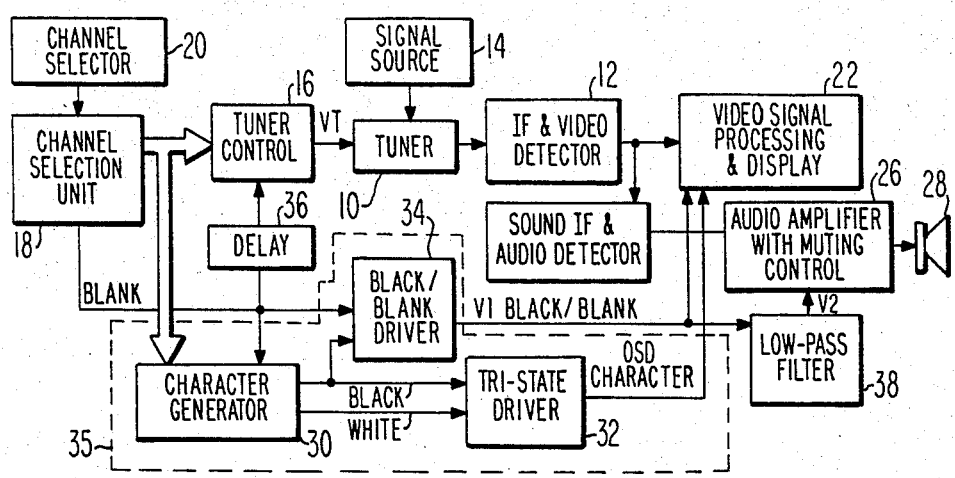

United States Patent [19]

Testin et al.

[11] Patent Number: 4,641,190
[45] Date of Patent: Feb. 3, 1987

[54] MUTING SYSTEM

[75] Inventors: William J. Testin; Juri Tults, both of Indianapolis, Ind.

[73] Assignee: RCA Corporation, Princeton, N.J.

[21] Appl. No.: 733,215

[22] Filed: May 10, 1985

[51] Int. Cl.[4] .............................................. H04N 5/60
[52] U.S. Cl. .................................. 358/165; 358/192.1; 455/194
[58] Field of Search .................. 358/165, 191.1, 192.1; 455/194

[56] References Cited

U.S. PATENT DOCUMENTS

| | | | |
|---|---|---|---|
| 3,602,822 | 8/1971 | Evans et al. | 455/158 |
| 3,845,394 | 11/1972 | Hamada | 455/158 |
| 3,882,400 | 1/1974 | Hamada | 455/158 |
| 3,984,828 | 10/1976 | Beyers | 358/166 |
| 4,107,614 | 8/1978 | Sugai | 358/165 |
| 4,238,771 | 12/1980 | Hongu | 358/165 |
| 4,279,035 | 7/1981 | Skerlos | 358/192.1 |
| 4,280,139 | 7/1981 | Mogi | 358/165 |
| 4,525,867 | 6/1985 | Shiratani | 455/194 |

Primary Examiner—Howard W. Britton
Attorney, Agent, or Firm—Paul J. Rasmussen; Peter M. Emanuel; Adel A. Ahmed

[57] ABSTRACT

A blanking signal is generated in a television receiver when a channel change selection is made. The blanking signal is low-pass filtered and thereafter controls the muting of the audio channel. Muting and un-muting are thus accomplished gradually, without audio disturbance. The tuning voltage is allowed to change to the new value required only after a delay period following the start of the blanking signal. Muting is therefore substantially complete before tuning transients can occur.

12 Claims, 2 Drawing Figures

U.S. Patent    Feb. 3, 1987    4,641,190

MUTING SYSTEM

The present invention concerns audio muting arrangements such as may, for example, be employed in a television receiver.

Modern television receivers typically employ voltage tuned elements, such as varactor diodes, in the tuner portion of the receiver. The tuning voltage appropriate to the selected channel is typically generated by a control unit which may include a micro-computer. When a new channel selection occurs, a finite time is required for processing the tuning instruction and for the tuning voltage to change and settle at the new value corresponding to the newly selected channel. During this interval, no proper picture or sound signals are produced and it is usual to blank the picture screen and to mute the audio output against undesired noise responses which tend to occur during the retuning process.

However, a finite time is also required for a muting signal to bring about a sufficient degree of muting. The rate at which muting can be accomplished is limited, since too rapid muting itself tends to cause disturbing audio transients. Disturbances caused by the initial portion of the retuning process therefore tend not to be adequately suppressed since the muting process is also just getting started.

In accordance with an aspect of the invention, a control arrangement in a television receiver is responsive to a channel change signal for causing a muting arrangement to mute the audio output. Thereafter, following the lapse of a predetermined time delay, the control arrangement causes the tuner to tune the receiver to the selected channel. According to another aspect of the invention, the muting arrangement responds to a muting control signal provided by the control arrangement by way of a low-pass filter arrangement. The low-pass filter arrangement limits the rate of change of the muting control signal such that the audio output exhibits substantially no disturbing transient associated with a change in the muting signal.

Figure 2:
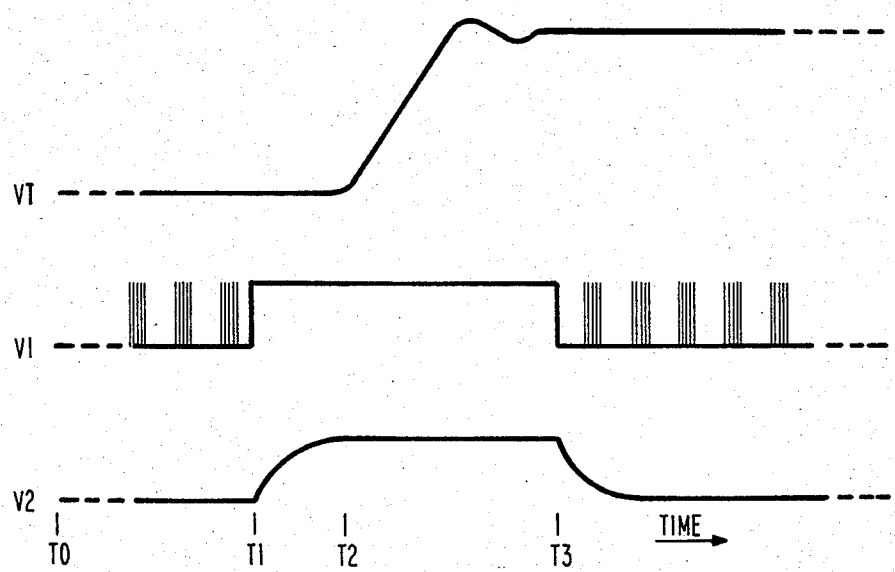

This and other features of the invention will be described in detail with reference to the accompanying drawing in which:

FIG. 1 shows in block form a preferred embodiment of the invention incorporated in a television receiver; and FIG. 2 shows signal waveforms helpful in understanding the invention.

The television receiver shown in FIG. 1 includes a tuner 10 and an IF and video detector unit 12 for producing a composite video signal from the one of a plurality of received RF television signals corresponding to a selected channel from a source 14. Tuner 10 is controlled by a tuning voltage and bandswitching signals generated by a tuner control unit 16 in response to digital signals supplied by a channel selector unit 18 representing the channel number entered by way of a channel selector 20.

The luminance and chrominance portions of the composite video signal produced by IF and video detector unit 12 are coupled to a video signal processing and display unit 22, e.g., including a kinescope with associated deflection arrangement.

The sound signal portion of the output of IF and video detector unit 12 is processed in a sound IF and detector unit 24. The recovered audio signal is amplified by an audio amplifier 26 for reproduction by a loud-speaker 28. Amplifier 26 includes a muting arrangement for selectively muting its output in response to a control signal.

Synchronizing signals are separated in the usual manner (not shown) and serve to synchronize the deflection arrangement and a character generator 30. Portions of the television receiver thus far described are conventional. By way of example, portions corresponding to those portions of the television receiver shown in FIG. 1 and described above can be found in RCA television receivers such as are described in "RCA Color Television Basic Service Data CTC 131, File 1984, Second Edition," with Supplements S1, S2 and Addendum 1, published by RCA Corporation Consumer Electronics, Technical Publications, P.O. Box 1976, Indianapolis, Ind. 46206.

The channel number representative signals generated by channel selection unit 18 and other coded signals, such as for the time of day, are coupled to character generator 30. Character generator 30 displays the channel number, by way of example, when enabled to do so by channel selection unit 18. A similar character generator to character generator 30 is described in U.S. Pat. No. 3,984,828 issued in the name of B. W. Beyers, Jr. on Oct. 5, 1976. Character generator 30 produces a white signal component corresponding to the character and a black signal component corresponding to the leading and trailing edging portions associated with the character for each horizontal scanning line (or slice) of the character display. The black and white character signal components are combined in a tri-state driver 32 and the output is coupled to the signal processing circuitry in video signal processing and display unit 22 in the form of a single signal including both white and black signal portions. This type of character signal includes a third, inactive or neutral portion which does not cause either a white or black character portion to be displayed. Such "tri-state" character signals are advantageous since they require only a single signal conductor per electron gun for coupling the character signal components to the signal processing circuitry. Tri-state character signals are also advantageous since the third or inactive state may be made to correspond to a high output impedance state of the character generator. This simplifies the circuitry used to combine the character signals with normal video signals for coupling to the picture tube since the high output impedance of the character generator provided in the inactive state does not load the normal video signal paths.

Channel selection unit 18 also provides a blanking signal which is amplified by a driver 34 and the resulting amplified blanking signal is coupled to video signal processing and display unit 22.

For cost saving reasons, character generator 30, tri-state driver 32 and blanking signal driver 34 are desirably incorporated in a single integrated circuit, such as integrated circuit 35, indicated in FIG. 1, by way of example. To enable such an integrated circuit to be used in different types of television receivers, including those that process two separate black and white character signals rather than a single tri-state character signal containing both black and white signal components, it is desirable that separate black and white character signals be provided. To that end, the black signal is coupled to driver 34 where it is combined with the blanking signal generated by channel selection unit 18 to form a composite "black/blank" signal containing both blanking pulses and black pulses. This signal is shown in FIG. 2 as waveform V1. Accordingly, black pulses as well as blanking pulses are available for use in a receiver. Since the purpose of both the black and blank pulses is to cause the screen to go black, one signal theoretically will not interfere with the other with respect to the operation of video signal processing and display unit 22. However, in practice the black/blank signal should desirably be low-pass filtered in the same manner as described below with respect to the muting signal to remove the black pulses before application of the black/blank signal to the blanking signal input of video signal processing and display unit 22 to prevent character ghosts due to different signal path delays for the tri-state character and the black-blank signals. For a television receiver requiring separate black and white character signals, the white signal may be simply derived from the tri-state character signal output of tri-state driver 32 by connecting the tri-state character signal output to a pull-up resistor which is connected at the other end to a source of positive supply voltage. In that case, the inactive level is "pulled-up" to the black level and the tri-state signal is converted to a bi-state white character signal.

A more detailed description of similar character generator arrangements is provided in a concurrently filed patent application Ser. No. 732,865 filed May 10, 1985, entitled "TRI-STATE ON-SCREEN DISPLAY SYSTEM", in the name of ROBERT JOSEPH GRIES, and assigned to the same assignee, RCA Corporation, as is the present application.

The blanking pulse is generated by channel selection unit 18 when a new channel selection is made. The blanking pulse is also applied to a delay unit 36 which provides a delayed pulse to tuner control unit 16 for enabling the tuning voltage VT to change to the value corresponding to the tuning required for the new channel selection. As shown in FIG. 2, whereas the blanking pulse component of V1 starts at time T1, the tuning voltage VT only begins to change at time T2, where the delay T2−T1 corresponds to the delay introduced by delay unit 36.

The "black/blank" signal V1, described above, is low-pass filtered by a low-pass filter 38. Typically, filter 38 may comprise a series resistance and shunt capacitance filter. The filtered signal, which is shown as V2 in FIG. 2, controls the muting of audio amplifier 26. Whereas V1 rises and falls abruptly, in accordance with digital control, V2 rises and decays gradually. Furthermore, the black pulses present in V1 are substantially eliminated in V2 by low-pass filter 38. Audio amplifier 26 will therefore be muted gradually and will remain constantly muted until V2 decays at time T3, thus gradually removing the muting. It will be noted that the tuning voltage VT starts to change only after audio amplifier 26 has been fully muted at time T2. Consequently, tuning disturbances will not be amplified. Likewise, audio amplifier 26 remains muted until after the tuning voltage has settled at its new value at time T3, thus ensuring that audio amplification is only restored after tuning disturbances have substantially ceased.

The implementation of the invention in accordance with FIG. 1 is illustrative. Various modifications will suggest themselves to one skilled in the art. For example, various functions, such as the delay in delay unit 36, may be readily implemented by the use of a micro-computer. Such modifications are contemplated to be within the scope of the present invention defined by the following claims.

What is claimed is:

1. In a television receiver, including channel selection means, tuning means for tuning said receiver to a channel, and audio channel signal processing means for providing an audio output, audio muting apparatus comprising:

muting means associated with said audio channel signal processing means and having selectable muting and non-muting modes of operation wherein, when said muting mode is selected, said audio output is gradually reduced such that, following the lapse of a muting time interval, said audio output is substantially completely muted; and control means coupled to each of said tuning means and said muting means and being responsive to said channel selection means selecting a channel not presently being received for selecting said muting mode so as to begin a period of continuous muting; and thereafter, following the lapse of a first predetermined time delay, longer than said muting time interval, causing said tuning means to tune said receiver to said selected channel.

2. The apparatus recited in claim 1 wherein:

said muting means is responsive to a muting control signal; and said control means provides said muting control signal.

3. The apparatus recited in claim 2 wherein:

said control signal is coupled to said muting means by way of low-pass filter means.

4. The apparatus recited in claim 3 wherein:

said low-pass filter limits the rate of change with time of said muting control signal such that said audio output signal exhibits substantially no disturbing signal associated with a change in said muting control signal.

5. The apparatus recited in claim 1 wherein:

said control means selects said non-muting mode of said muting means so as to end said period of continuous muting after said control means causes said tuning means to tune said receiver to said selected channel.

6. The apparatus recited in claim 5 wherein:

said tuning means exhibits a settling time interval for completing said tuning; and said control means selects said non-muting mode of said muting means so as to end said period of continuous muting following the lapse of a second predetermined time delay after said control means causes said tuning means to tune said receiver to said selected channel, said second predetermined time delay being longer than said settling time of said tuning means.

7. The apparatus recited in claim 6 wherein:

said muting means is responsive to a muting control signal; and said control means provides said muting control signal.

8. The apparatus recited in claim 7 wherein:

said control signal is coupled to said muting means by way of low-pass filter means.

9. The apparatus recited in claim 8 wherein:

said low-pass filter limits the rate of change with time of said muting control signal such that said audio output signal exhibits substantially no disturbing signal associated with a change in said muting control signal.

10. In a television receiver, including channel selection means, tuning means for tuning said receiver to a selected channel, video signal processing and display means, audio channel signal processing means for providing an audio output, and on-screen display (OSD) character signal generating means coupled to said video signal processing and display means and, wherein said channel selection means generates a blanking signal when selecting a channel not presently being received, and further including signal combining means for combining said blanking signal and said OSD character signal for forming a composite signal, apparatus comprising:

delay means responsive to said blanking signal for providing a delayed signal for enabling said tuning means to tune said receiver to said selected channel not presently being received;

filter means for low-pass filtering said composite signal to provide a filtered signal substantially free of said OSD character signal; and muting means associated with said audio signal processing means for selectively muting said audio output, said muting means being coupled to said filter means for muting said audio output in accordance with said filtered signal.

11. The apparatus recited in claim 10 wherein:
said character generating means and said signal combining means are substantially incorporated in a single integrated circuit unit.

12. In a television receiver, including channel selection means, tuning means for tuning said receiver to a channel, said tuning means exhibiting a settling time interval for completing said tuning, an audio channel signal processing means for providing an audio output, and a video channel signal processing means for providing a video output, apparatus comprising:

disabling means associated with at least one of said audio or video channel signal processing means for selectively disabling said channel signal processing means for providing the respective output such that, when said disabling means is caused to disable said one of said audio or video channel signal processing means, said respective output is gradually reduced until, following the lapse of a disabling time interval, said respective output is substantially completely disabled ; and control means coupled to each of said tuning means and said disabling means and being responsive to said channel selection means selecting a new channel for causing said disabling means to disable said respective output so as to begin a period of continuous disabling;

thereafter, following the lapse of a first predetermined time delay, longer than said disabling time interval, causing said tuning means to tune said receiver to said selected channel and thereafter following the lapse of a second predetermined time delay, longer than said settling time interval, causing said disabling means to cease to disable said respective output for ending said period of continuous disabling.

* * * * *